E. L. COUCH.

APPARATUS FOR CLEANING ARTICLES.

APPLICATION FILED JAN. 28, 1915.

Reissued Nov. 9, 1915.

Re. 14,007.

3 SHEETS—SHEET 1.

Witnesses:

S. H. Clarkes

Bessie Rauber

Inventor

Elbert L. Couch

By John H. Joy Atty.

COLUMBIA PLANOGRAPH CO., WASHINGTON, D. C.

Search Room

E. L. COUCH.

APPARATUS FOR CLEANING ARTICLES.

APPLICATION FILED JAN. 28, 1915.

Reissued Nov. 9, 1915.

14,007.

3 SHEETS—SHEET 2.

Witnesses:
S. H. Clarke
Bessie Rourke

Inventor
Elbert L. Couch
By John H. Joy Atty.

COLUMBIA PLANOGRAPH CO., WASHINGTON, D. C.

E. L. COUCH.

APPARATUS FOR CLEANING ARTICLES.

APPLICATION FILED JAN. 28, 1915.

Reissued Nov. 9, 1915.

14,007.

3 SHEETS—SHEET 3.

Witnesses:

S. H. Clarke

Bessie Rourke

Inventor

Elbert L. Couch

By John H. Joy Atty.

COLUMBIA PLANOGRAPH CO., WASHINGTON, D. C

Search Room

UNITED STATES PATENT OFFICE.

ELBERT L. COUCH, OF HARTFORD, CONNECTICUT, ASSIGNOR TO THE COUCH-DEAN CORPORATION, INCORPORATED, OF HARTFORD, CONNECTICUT, A CORPORATION OF CONNECTICUT.

APPARATUS FOR CLEANING ARTICLES.

14,007. Specification of Reissued Letters Patent. Reissued Nov. 9, 1915.

Original No. 1,068,568, dated July 29, 1913. Serial No. 745,423. Application for reissue filed January 28, 1915. Serial No. 4,958.

*To all whom it may concern:*

Be it known that I, ELBERT L. COUCH, a citizen of the United States, residing at No. 564 New Britain avenue, in Hartford, county of Hartford, and State of Connecticut, have invented certain new and useful Improvements in Apparatus for Cleaning Articles, of which the following is a specification.

The object of my invention is to provide a device of a class specified, which has features of novelty and advantage.

It comprises a movable apparatus whose purpose is to carry articles into or through one or more chambers in which said articles are subjected to treatment by liquids, gases, heat and otherwise.

Figure 1:
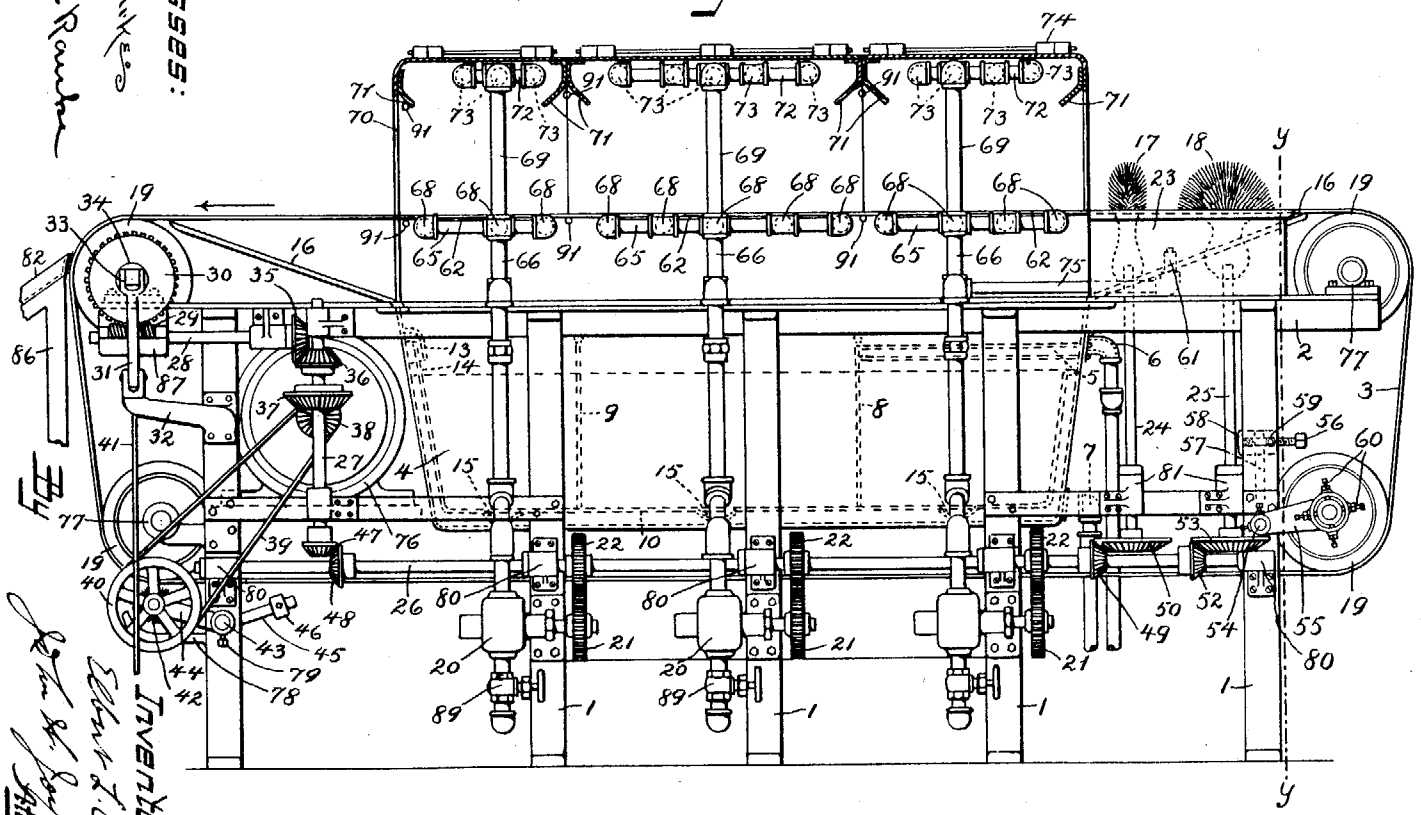
Figure 2:
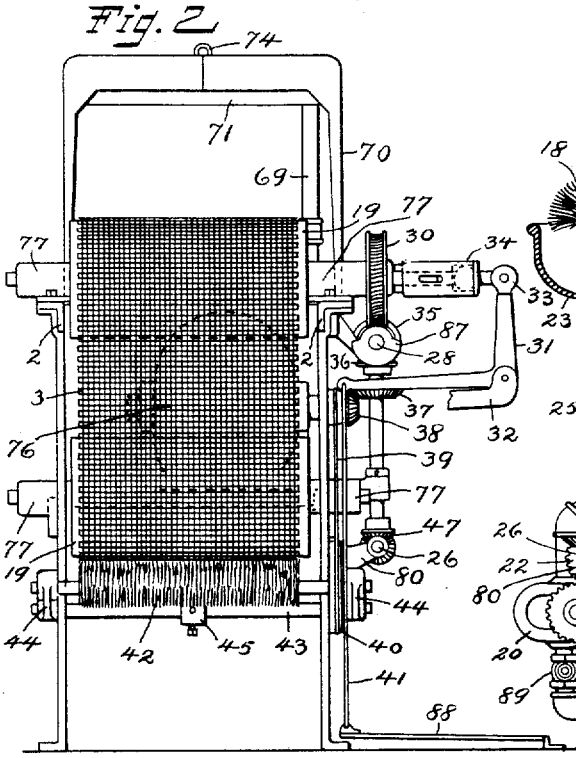
Figure 3:
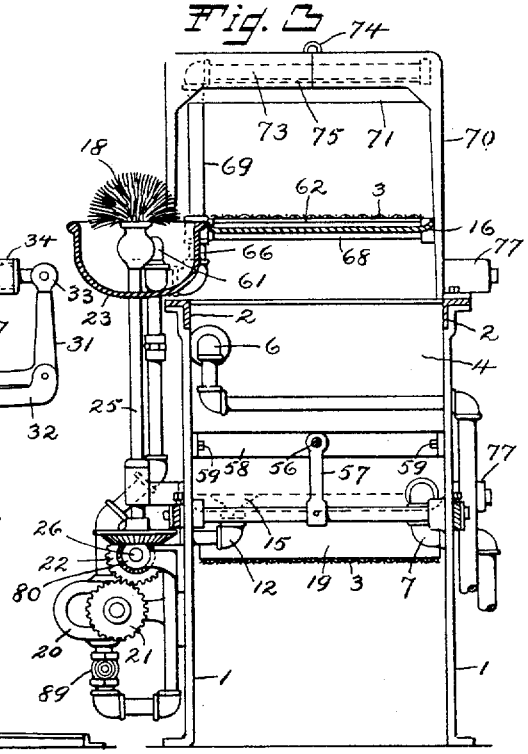
Figure 4:
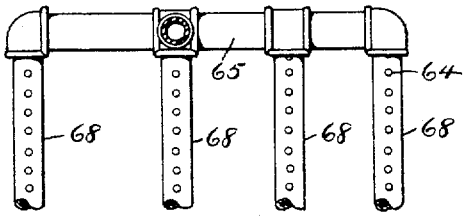
Figure 5:
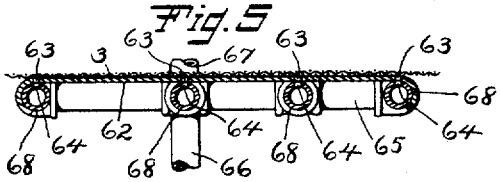
Figure 6:
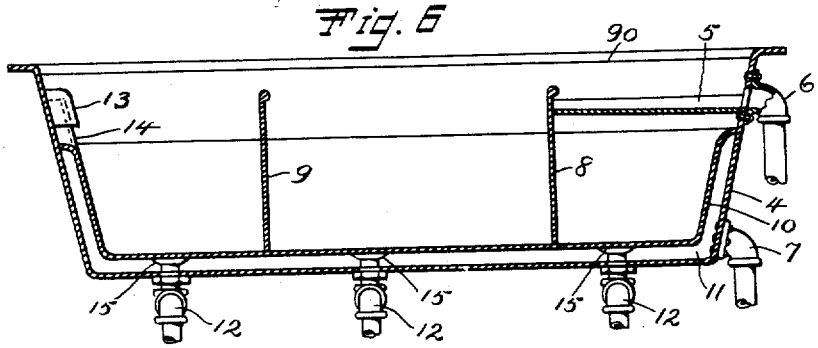
Figure 7:
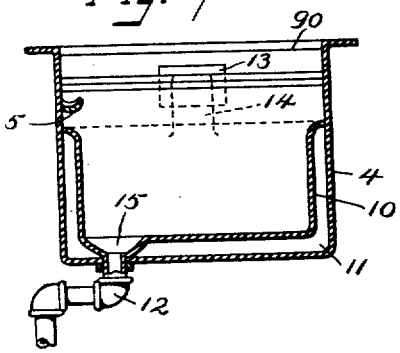
Figure 8:
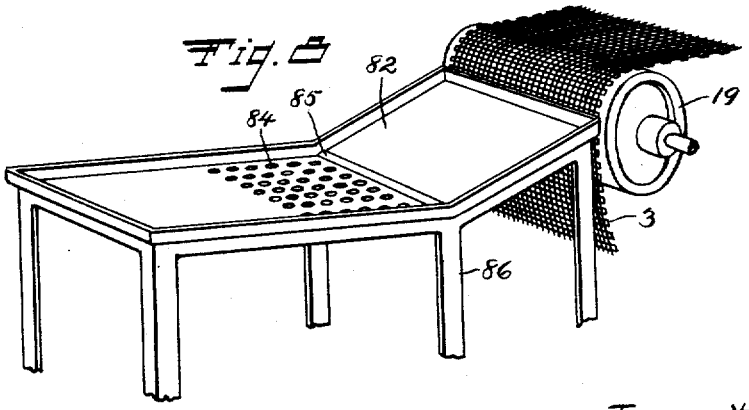

Figure 1 is a side view of the apparatus. Fig. 2 is a view of the apparatus from the receiving end. Fig. 3 is a view partly in section of the apparatus from the transmitting end. Fig. 4 is a view of the pipes or sprinklers, by means of which the liquid is applied, looking from above. Fig. 5 is a sectional view of these pipes or sprinklers looking from the side. Fig. 6 is a sectional side view of the central part of the apparatus which contains the liquid, and from which the said liquid is supplied to the pipes, or sprinklers of Figs. 4 and 5. Fig. 7 is a sectional end view of Fig. 6. Fig. 8 is a perspective view of the receiving stand.

The apparatus may be constructed in a great variety of forms and its various parts or elements, also, may be constructed in many ways, all of which I claim as my invention, and I do not wish to confine myself to the particular machine described below; any apparatus which fulfils the general purpose stated above being within the construction claimed.

At the top of the machine as at present constructed there are one or more chambers in which the articles are treated as they pass through. In the central portion is a receptacle shown more particularly in Fig. 6, which may have one or more compartments and is a means for containing the liquid to be supplied to the chambers above. At the lower part of the machine are one or more pumps which force the liquid from its respective receptacle through suitable means to the chambers above. Any other desired means for supplying said liquid may be used.

Referring now more particularly to the drawings, the apparatus is supported by some means such as the standard 1 and comprises means for moving the articles to be treated which means may be rollers or wheels, 19, over which passes a belt 3, on which the articles are placed. It is apparent that the articles may be carried along by placing them in movable receptacles, which may be attached to or placed upon the belt or attached together, thus eliminating the belt entirely. Any desirable substitute may be used for this purpose.

The apparatus is actuated by a crank or some other device such as the motor 76, from which the power is transmitted to the other parts of the machine by means of a belt or a system of gears or otherwise. I employ various methods of transmission preferably the following: That which carries the power to the pumps comprises several bevel or miter gears 37, 38, 47 and 48, by means of which the shaft 26 is revolved, upon which is immovably fastened the gears 22 which engage the gears 21. These gears 21 are connected by shafts to the pumps 20 which in turn are connected with the pipes 65, 68, 72, etc. The power is supplied to the rollers by means of the bevel or miter gears 36 and 35, which cause to revolve the shaft 28, on which is the worm 29, which intermeshes with the worm gear 30. This worm gear and the roll 19 are immovably fixed to the shaft 77. The roll 19 therefore revolves as the worm gear 30 revolves, causing the belt 3 to move in the direction of the arrow. The movement of the belt passing over the other rolls causes them in turn to revolve. At the center of the machine are the tubs shown in Fig. 6. This portion of the apparatus may be constructed in any manner and in one or more compartments, the purpose being to have a receptacle or other means by which or from which liquid may be applied to the pipes 68 and 73.

The construction which I use is as follows: The tub is constructed in one or more compartments, the first having an outlet into the second, the second into the third, etc., the liquid being drained preferably merely from the third compartment. There are partitions 8 and 9 between these compartments, 9 being slightly higher than 8 and 8 being slightly higher than the outlet 6. These partitions may be constructed so as to reach to the top of the tub and the outlet may consist of holes or other means of communication between the compartments. 7 is a steam pipe through which steam is supplied to the steam jacket between the walls 4 and 10. This steam jacket 11 has an outlet 14 into the apartment 13, whose opening is generally below the surface of the water. The liquid is supplied to the tubs in any manner, and it is preferable that they be kept full or nearly so. This liquid issues from the tubs through the pipes 15 and 12 into the pumps 20, through which it is forced into the pipes or sprinklers 68 and 73. A certain amount of condensation of steam takes place at 13 and 14 which tends to increase the supply of fresh water, compensating for that which is drained off or lost.

The articles to be cleaned are placed upon the belt 3 and when the belt is moving they are carried through the chambers at the top of the apparatus, in which liquid, gas or heat is applied to them. This portion of the apparatus I prefer to construct in this manner. There are three chambers having pipes 68 perforated at 63 as shown in Fig. 4, on the upper side, so that when the liquid is forced in to them through the pipe 66 the water is sprayed upward. In like manner the pipes 73, which are also connected to the pipe 66 by means of the pipe 69, are perforated on the underside, so that the water or liquid is sprayed downward. It will thus be seen that as the articles pass through these chambers they will be subjected to treatment by the liquid from both below and above. I prefer to have this liquid forced through the compartment at high pressure. The belt 3 is preferably constructed for this purpose as a mesh or perforated belt in order that the articles may easily pass over it. These chambers are usually constructed so that they are inclosed on all sides except where the belt enters and emerges in order that the liquid may be retained inside and be collected in the tub, from which it can pass into the pipe 15 and back through the chambers. The ceilings of these upper chambers are curved inward at #71 in order to prevent the escape of any liquid outside the respective chambers. It will thus be seen that the liquid in each chamber, as for instance in the center chamber, will return to the center tub after use, and then again be supplied to the center chamber, thus retaining to a great extent the same liquid in each chamber. For this purpose the partitions between the tubs may be in line with those between the upper chambers. The brushes 17 and 18 are connected with the shaft 26 by means of the bevel gears 49 and 50, and 52 and 53, so as to cause the brushes to revolve. By means of these brushes if necessary any loose matter may be removed from the articles before they are placed on the belt. These brushes are moistened by a spray 61, which is connected to one of the pumps 20. There is a receptacle 23 underneath these brushes for the purpose of collecting and draining off liquid.

The belt 3 is constructed either in one whole piece or in the removable sections, preferably the latter, in order that if necessary to tighten the same one or more sections may be removed. Any other method of tightening the belts may be used, one of which is shown in the drawing. The screw 56 passes through the threaded arm 57 and engages the plate 58. When this screw is turned to the right the upper end of the arm 57 is moved away from the plate 58. This arm 57 is connected immovably at an angle to the arm 55 at the point 54. It will thus be seen therefore that as the arm 57 is forced away from the plate 58 the upper end of the arm 55 will be forced downward carrying the roll with it, and thus tightening the belt. A screen 90 may be placed over the tubs to collect any refuse which falls from the articles. This screen is preferably removable and may be made in several sections. It may of course be placed lower, even being bent downward to the bottom of the compartments. One or more of these compartments may be used solely for the purpose of draining, the others, if desired, being roofed over. A trough 5 is so constructed in one or more of the compartments as to have its underside slightly inclined toward the outlet in order that it may collect any grease which floats on the surface of said compartments and carry the same off into the next tub and finally through the outlet 6, from which it is drained through a pipe or in any other manner, and carried to a separator where the grease is turned into soap and then returned if necessary to the liquid in the tubs.

I find it is desirable to have brushes so constructed as to engage the belt at various places on the apparatus in order to remove any water that may be on the belt at that point, and thus prevent its moving along the belt any farther. These brushes may be revolving or otherwise and may be placed upon the apparatus so as to engage the belt at any point. I have shown one of these brushes 42, which is connected to the wheel 40, which wheel is connected to the motor by means of the belt 39 and thereby is caused to revolve, preferably in a direction opposite to that in which the belt is moving. Steam jets 91 are placed at various points in order to confine the liquid or moisture within these points.

There is a platform 88, upon which one

Search Room

203 of the operators stands when the machine is in motion. This platform is connected by means of the rod 41 and the arm 31 to the clutch 34. When the operator leaves this platform 88 the clutch is automatically thrown out and thus the belt ceases to move. As soon as the operator returns to this platform the clutch is again thrown into operation and the belt caused to move.

At 16 are two inclined planes for the purpose of collecting any water which may drop off the belt at this point and turn the same into the tubs.

At the receiving end of the apparatus is a stand shown in Fig. 8, constructed to receive the articles from the belt 3, from which point they pass down through an inclined plane 82 to the bumper 85 on the draining table 84.

The belt I prefer to construct of what I call electrolytically active plate, that is, a plate composed of tin, aluminum and other metals in combination and I prefer to supply the middle chamber with a substance commercially known as silverease or some such combination or liquid. Such substance is disclosed in patent to Arthur #674,254, dated May 14, 1901. The plate 62, which passes over the top of the pipes 68 is also preferably constructed of this material and preferably perforated, although I may dispense with the plate entirely and also may, if desired, construct the pipes of this material. I may broaden out the pipes 68 and 73 to make them in the shape of a hollow plate with perforations. All the three chambers may be constructed in this manner and may, if necessary, all contain silverease. It is preferable however to have the chamber in which the articles first enter supplied with silverease and soap; the middle chamber supplied with silverease, and the third chamber supplied with hot rinsing water. One or more of these chambers may of course be supplied with any liquid whatever and I frequently use one of them as a steam chamber, or merely heated for the purpose of drying. It will thus be seen that when the articles pass over these pipes they are brought into contact with the electrolytically active plate and the silverease in such a manner that electrolysis takes place, thus cleaning the articles and removing the tarnish and all foreign matter.

The basket or belt, or any other portion of the machine may be constructed of the electrolytically active material if convenience requires.

From the preceding description taken in connection with the annexed drawings, it will be obvious that my apparatus comprises a support or carrier adapted to sustain and to cause the movement of the articles, the article carrying portion of the support being preferably of electrolytically active material. I prefer, as will be understood, that the support, carrier or equivalent device be movable, so that the articles can be positively conducted from one point to another, and as will be inferred, an endless belt answers the desired conditions. It will also be apparent that the articles are caused to move through a chambered structure and that while therein they are subjected to electrolytic action, the electrolyte being preferably in the form of a stream or streams of suitable liquid. The electrolyte is withdrawn from a suitable receptacle and is sprayed upon the article or articles which are preferably in contact with the electrolytically active material which as will be clear, constitutes one electrode of the cell, the particular article, whether of silverware or other suitable material to be cleaned presenting the other electrode, and the electrolyte of whatever nature it may be bridging across the two, the silverware or the like being preferably in contact with the electrode during the foregoing action. As a matter of fact the electrolyte is practically maintained in circuit form; that is to say the electrolyte is pumped or otherwise withdrawn from its receptacle or tank, elevated and then by gravity or otherwise permitted to descend into the tank, the article to be cleaned being caused to intersect or pass through the stream.

Claims:

1. An apparatus for cleaning articles comprising one or more chambers confining chemicals or gases, a movable belt of electrolytically active material to carry articles into and from said chambers, means for supplying liquids to said chambers, said chemicals being such as will react with said electrolytically active material, said means comprising receptacles beneath said chambers whose partitions are in line with the partitions between said chambers.

2. An apparatus for cleaning articles comprising a movable portion, chambers through which said articles are carried, plates and pipes within said chambers composed of electrolytically active material, and chemicals which react with said electrolytically active material.

3. An apparatus for cleaning articles comprising a movable portion of electrolytically active material, chambers through which said movable portion passes, pipes and plates within said chambers, composed of electrolytically active material, liquids within said chambers which react with said electrolytically active material, a receptacle which contains said liquids, said receptacles having means for heating the same, and for supplying the same with fresh liquid, and for draining the same.

4. An apparatus for cleaning articles comprising movable portions of electrolytically active material, chambers through which said movable portion passes, pipes and plates within said chambers, composed of electrolytically active material, liquid within said chambers, which react with said electrolytically active material, receptacles which contain said liquid, said receptacles having means for heating the same and for supplying the same with fresh liquid, and for draining the same, and a receiving table in connection with said movable belt comprising an inclined plane and a bumper.

5. An apparatus for cleaning articles comprising chambers, means for moving said articles through said chambers, electrolytically active material within said chambers, liquids which react with said electrolytically active material, and means for continuously supplying said liquids.

6. An apparatus for cleaning articles comprising chambers, means for moving said articles within said chambers, liquids, gases and heat within said chambers, to be applied consecutively to said articles, electrolytically active material in one or more of said chambers, liquids within said chambers, which react with said electrolytically active material, means for continuously supplying said liquids, gases and heat within said chambers, means for confining said liquids and gases to their respective chambers.

7. An apparatus for cleaning articles, an endless belt of electrolytically active material, a receptacle, means for supplying chemicals and heat to said receptacle, said chemicals being such as will react with said electrolytically active material, brushes for acting upon the articles, and means for moistening said brushes.

8. An apparatus for cleaning articles, an endless belt of electrolytically active material, a receptacle, means for supplying chemicals and heat to said receptacle, said chemicals being such as will react with said electrolytically active material, brushes for acting upon the articles, means for moistening said brushes, and steam jets arranged at intervals for confining the liquid or moisture within certain locations.

9. An apparatus for cleaning articles, an endless belt of electrolytically active material, a receptacle, means for supplying chemicals and heat to said receptacle, said chemicals being such as will react with said electrolytically active material, brushes for acting upon the articles, means for moistening said brushes, and means for revolving said brushes in a direction opposite to that in which the belt moves.

10. An apparatus for cleaning articles, an endless belt of electrolytically active material, a receptacle, means for supplying chemicals and heat to said receptacle, said chemicals being such as will react with said electrolytically active material, brushes for acting upon the articles, means for moistening said brushes, means for revolving said brushes in a direction opposite to that in which the belt moves, and steam jets disposed at intervals along the path of the belt.

11. An apparatus for cleaning articles comprising a device to support and to cause the movement of the articles from one point to another, the article-carrying portion of the device being of electrolytically-active material, a receptacle for an electrolyte, and means for withdrawing the electrolyte from the receptacle and for causing the electrolyte to bridge the article and said electrolytically active material.

12. An apparatus for cleaning articles comprising a chambered structure, and means for carrying and causing the movement of the articles through the chambered structure and for subjecting them to electrolytic cleaning action while in said structure, the chambered structure being mounted above the path of movement of the articles.

13. An apparatus for cleaning articles comprising means for maintaining an electrolyte in circuit form, a support to carry and cause the movement of the articles through the circuit of the electrolyte, the article-carrying portion of the support being of electrolytically-active material.

14. An apparatus for cleaning articles comprising a chambered structure, an endless belt having an electrolytically active article-carrying portion, the chambered structure being above the belt, the belt being adapted to carry the articles through the chambered structure, and means for causing an electrolyte to bridge across the article and the belt while in the chambered structure.

15. An apparatus for cleaning articles comprising a movable device to support and to cause the movement of the articles from one point to another, the article-carrying portion of the device being of electrolytically active material, a receptacle for an electrolyte, and means for withdrawing the electrolyte from the receptacle and for delivering said electrolyte against said articles while the latter are in contact with said article-carrying portion.

16. An apparatus for cleaning articles comprising a device to support and to cause the movement of the articles from one point to another, the article-carrying portion of the device being of electrolytically active material, a receptacle containing an electrolyte and means for withdrawing the electrolyte from the receptacle and for directing the same in two portions against opposite sides of the articles while in contact with said article carrying portion.

17. An apparatus for cleaning articles comprising a chamber, means for moving said articles through said chamber, said chamber being located above the path of Search Ro movement of the articles, electrolytically active material within said chamber, an electrolyte which reacts with said electrolytically active material.

18. An apparatus for cleaning articles comprising a chamber, means for moving said articles through said chamber, said chamber being located above the path of movement of the articles, electrolytically active material within said chamber, an electrolyte which reacts with said electrolytically active material, said electrolyte being in circuit form.

19. An apparatus for cleaning articles comprising a chamber, means for moving said articles through said chamber, said chamber being located above the path of movement of the articles, said means being of electrolytically active material, an electrolyte within said chamber which reacts with said electrolytically active material.

20. An apparatus for cleaning articles having a device to support and to cause the movement of the articles from one point to another, and also having means of electrolytically active material with which said articles make contact during their movement, a receptacle for an electrolyte, and means for withdrawing the electrolyte from the receptacle and for causing the same to bridge the article and said electrolytically active material.

In testimony whereof I affix my signature in presence of two witnesses, Jan. 26, 1915.

ELBERT L. COUCH.

Witnesses:
G. Clarence Woolley,
Bessie Rourke.

Copies of this patent may be obtained for five cents each, by addressing the "Commissioner of Patents, Washington, D. C."